(12) United States Patent
Nguyen et al.

(10) Patent No.: US 11,363,428 B2
(45) Date of Patent: Jun. 14, 2022

(54) SYSTEM AND METHOD FOR PROVIDING VEHICULAR COMMUNICATION IN AN ADVANCED WIRELESS NETWORK

(71) Applicant: NEC CORPORATION, Tokyo (JP)

(72) Inventors: Phong Nguyen, Victoria (AU); Huei-Ming Lin, Victoria (AU)

(73) Assignee: NEC CORPORATION, Tokyo (JP)

( * ) Notice: Subject to any disclaimer, the term of this patent is extended or adjusted under 35 U.S.C. 154(b) by 309 days.

(21) Appl. No.: 16/493,393

(22) PCT Filed: Dec. 27, 2017

(86) PCT No.: PCT/JP2017/047424
§ 371 (c)(1),
(2) Date: Sep. 12, 2019

(87) PCT Pub. No.: WO2018/168169
PCT Pub. Date: Sep. 20, 2018

(65) Prior Publication Data
US 2020/0137536 A1 Apr. 30, 2020

(30) Foreign Application Priority Data
Mar. 15, 2017 (AU) .................................. 2017900909

(51) Int. Cl.
*H04L 1/16* (2006.01)
*H04L 27/26* (2006.01)
(Continued)

(52) U.S. Cl.
CPC ............. *H04W 4/40* (2018.02); *H04L 1/1642* (2013.01); *H04L 27/2607* (2013.01); *H04W 72/005* (2013.01)

(58) Field of Classification Search
CPC ..... H04L 1/1642; H04L 27/2607; H04W 4/40; H04W 4/46; H04W 72/005; H04W 72/02; H04W 76/14; H04W 8/005
See application file for complete search history.

(56) References Cited

U.S. PATENT DOCUMENTS

| 2016/0134383 A1* | 5/2016 | Banasky, Jr. ............ H04B 1/40 455/67.14 |
| 2017/0018187 A1* | 1/2017 | Kim ....................... G08G 1/164 |

(Continued)

FOREIGN PATENT DOCUMENTS

WO  2017/005293 A1  1/2017

OTHER PUBLICATIONS

NTT Docomo ("Use case for eV2X: information sharing for limited/full automated platooning", 3GPP TSG-SA WG1 Meeting #75, S1-162245, Aug. 29, 2016) (Year: 2016).*

(Continued)

*Primary Examiner* — Melvin C Marcelo
*Assistant Examiner* — Natali Pascual Peguero
(74) *Attorney, Agent, or Firm* — Sughrue Mion, PLLC (57) ABSTRACT

A method for providing vehicular communication in an advanced wireless communication system, which includes instant feedback to enable synchronized cooperative driving, is provided. The method comprises: identifying, at a first V2X-UE, one or more second V2X-UEs in proximity to the first V2X-UE; transmitting, from the first V2X-UE- and to the one or more second V2X-UEs, control channel information identifying a portion of a data pool allocated for V2X intention data; transmitting, from the first V2X-UE and to the one or more second V2X-UEs and on the identified portion of the data pool, V2X intention data; and receiving, at a first V2X-UE- and on a reserved feedback channel, (Continued)

confirmation of receipt of the V2X intention data from a V2X-UE of the one or more second V2X-UEs.

20 Claims, 7 Drawing Sheets

(51) Int. Cl.
*H04W 4/40* (2018.01)
*H04W 72/00* (2009.01)

(56) References Cited

U.S. PATENT DOCUMENTS

| | | | | |
|---|---|---|---|---|
| 2017/0295564 | A1* | 10/2017 | Tiirola | H04L 1/1861 |
| 2017/0347352 | A1* | 11/2017 | Luo | H04W 72/0413 |
| 2018/0077633 | A1* | 3/2018 | Chae | H04W 48/16 |
| 2018/0092086 | A1* | 3/2018 | Nammi | H04L 5/0069 |
| 2019/0090250 | A1* | 3/2019 | Lee | H04W 72/0446 |
| 2021/0127361 | A1* | 4/2021 | Yasukawa | H04W 28/26 |

OTHER PUBLICATIONS

LG Electronics ("Discussion on resource pool structure and control signaling for PC5-based V2V", 3GPP TSG RAN WG1 Meeting #83, R1-156892, Nov. 15-22, 2015) (Year: 2015).*
"Use case for eV2X: information sharing for limited/full automated platooning", NTT Docomo, 3GPP TSG-SA-WG1 Meeting #75, S1-162245, Aug. 29, 2016.
"Discussion on resource pool structure and control signaling for PC5-based V2V", LG Electronics, 3GPP TSG RAN WG1 Meeting #83, R1 -156892, Nov. 7, 2015.
"Partial and Out-of-Network Coverage Discovery", InterDigital Communications, 3GPP TSG RAN WG1 #80Bis, R1-152100, Apr. 10, 2015.
"Self-organizing D2D communication using knowledge enforcement", Iaesi, 3GPP TSG-RAN WG1#76bis, R1-141235, Mar. 22, 2014.
"DCI format of V2X SPS resources", ZTE, 3GPP TSG RAN WG1 Meeting #87, R1-1612100, Nov. 4, 2016.
Written Opinion for PCT/JP2017/047424, dated Mar. 27, 2018.
International Search Report for PCT/JP2017/047424, dated Mar. 27, 2018.

* cited by examiner

SYSTEM AND METHOD FOR PROVIDING VEHICULAR COMMUNICATION IN AN ADVANCED WIRELESS NETWORK

This application is a National Stage of International Application No. PCT/JP2017/047424 filed Dec. 27, 2017, claiming priority based on Australian Patent Application No. 2017900909 filed Mar. 15, 2017, the disclosure of which is incorporated herein in its entirety by reference.

TECHNICAL FIELD

The present invention relates to advanced wireless communication. In particular, although not exclusively, the invention relates to vehicular communication in an advanced wireless network.

Abbreviations

| | |
|---|---|
| 3GPP | 3$^{rd}$ Generation Partnership Project |
| 4G | 4th generation |
| 5G | 5th generation |
| C2C | Car to Car communication |
| cMTC | Critical MTC |
| C-V2X | Cellular V2X or Cellular based V2X |
| DL | Downlink |
| eMBB | Enhanced MBB |
| eV2X | Enhanced V2X |
| IE | Information Element |
| ITS | Intelligent Transport Systems |
| ITU | International Telecommunication Union |
| LTE | Long term evolution |
| LTE-A | Advanced LTE or 4G |
| MBB | Mobile Broadband |
| mMTC | Massive MTC |
| MTC | Machine type communication |
| NR | New Radio |
| N-RAT | New RAT |
| NR-V2X | New radio based Vehicle to Everything communication |
| NR-VCI | NR based V2X Control Information |
| OBD | On board Device |
| OBE | On broad equipment |
| Prose | 3GPP Proximity-based services |
| QoE | Quality of Experience |
| QoS | Quality of Service |
| RAN | Radio Access network |
| RAT | Radio Access technology |
| RB | Resource Block |
| RE | Resource Element |
| RS | Reference signal |
| RSU | Road Side Unit |
| SA | Scheduling assistance |
| SL | Sidelink |
| SSMS | Sensor and state map sharing |
| UL | Uplink |
| URLLC | Ultra-Reliable ultra-low latency communication |
| V2X | Vehicle to Everything communication |
| V2X Vehicle | V2X-UE equipped vehicle |
| V2X-UE | on board equipment supporting V2X/eV2X applications |
| VRU | Vulnerable Road User |
| Status-data | In connected vehicles communication, is status information such as position, speed, heading, acceleration, and etc.; or event information such as traffic jam, dangerous situation, emergency vehicle approaching, hazardous location, adverse weather and etc. The information may be packed into stateless, individual messages or probes which are either locally disseminated to neighbouring vehicles or sent to a central point where it can be aggregated and then again disseminated to other vehicles to make use of it. |
| Perception-data | In connected vehicles communication, may be abstracted data and/or high resolution or raw sensor data (i.e. sensor and state map), and in-vehicle information, received at a vehicle for further use in expanding detectable range of on-board sensor capability for locally established 'bird's eye view', 'see through', 'see with the eyes of others', local dynamic map, ; |
| Intention-data | In connected vehicles communication, may including driving intentions or pre-planned trajectories which may be shared among participating vehicles enables a vehicle to collect other vehicles pre-planned trajectories for further use in optimising its own driving decisions or actions |
| Synchronised-intention-data | In connected vehicles communication, are pre-planned trajectories or intention data which further requires coordination and confirmation of future manoeuvre i.e. synchronised trajectories. |
| Awareness-driving | Enables vehicles to disseminate theirs status-data, thus allowing other vehicles to become aware of their presence and of eventual hazards detected on the road. |

| | |
|---|---|
| Sensing-driving | Allows various traffic participants to provide additional information, namely information gained through various on-board sensors, enabling a vehicle to "see with the eyes of others" and so detect otherwise hidden objects or get a more accurate view on what is happening within their environment. |
| Cooperative-driving | Allows vehicles to share their intentions with other traffic participants, and so provide them with a glimpse into the individual future of each vehicle. The information may be then used by application driving algorithms to enable vehicles to accurately predict what other traffic participants will do in the near future and so optimise their own decisions and actions such as lane-merge assistance, arear reservation, cooperative adaptive cruise control |
| Synchronised-cooperative-driving | Allows vehicle to exchange and synchronise their driving trajectories among each other and so achieve optimal driving patterns and enable vehicles autonomously driving through almost all situations. |

BACKGROUND ART

Fourth generation (4G) 3GPP telecommunications systems are being successfully deployed at an accelerating pace all over the world. These systems enable more advanced services and applications that make use of the inherent benefits of LTE/LTE-A/LTE-A Pro technologies, such as higher data rate, lower latency, enhanced coverage, and sidelink communication.

Much attention has now been focused on the development of the next generation technology and services, also called fifth generation (5G) technology.

In particular, development of 5G systems is currently being investigated, with the initial target of commercial deployment being 2020, and lately being brought forward to 2018. In this regard, work has started in ITU and 3GPP in developing requirements for 5G systems, and to perform feasibility studies for technological specification development for new radio (NR) systems.

According to 3GPP TSG Radio Access Network (RAN), 3GPP is obliged to identify and develop the technology components, including NR access technology (also called new RAT), needed to satisfy both urgent market needs, and more long-term requirements, set forth by among others ITU. Furthermore, the NR access technology should be able to use any spectrum band ranging at least up to 100 GHz that may be made available for wireless communications even in a more distant future.

More specifically, 3GPP NR access technology (new RAT, N-RAT) shall be designed to meet a broad range of use cases including enhanced mobile broadband (eMBB), massive MTC (mMTC), critical MTC, mission critical communication (MCC) and ultra-reliable and ultra-low latency communications (URLLC), and enhanced V2X (eV2X).

Figure 1:
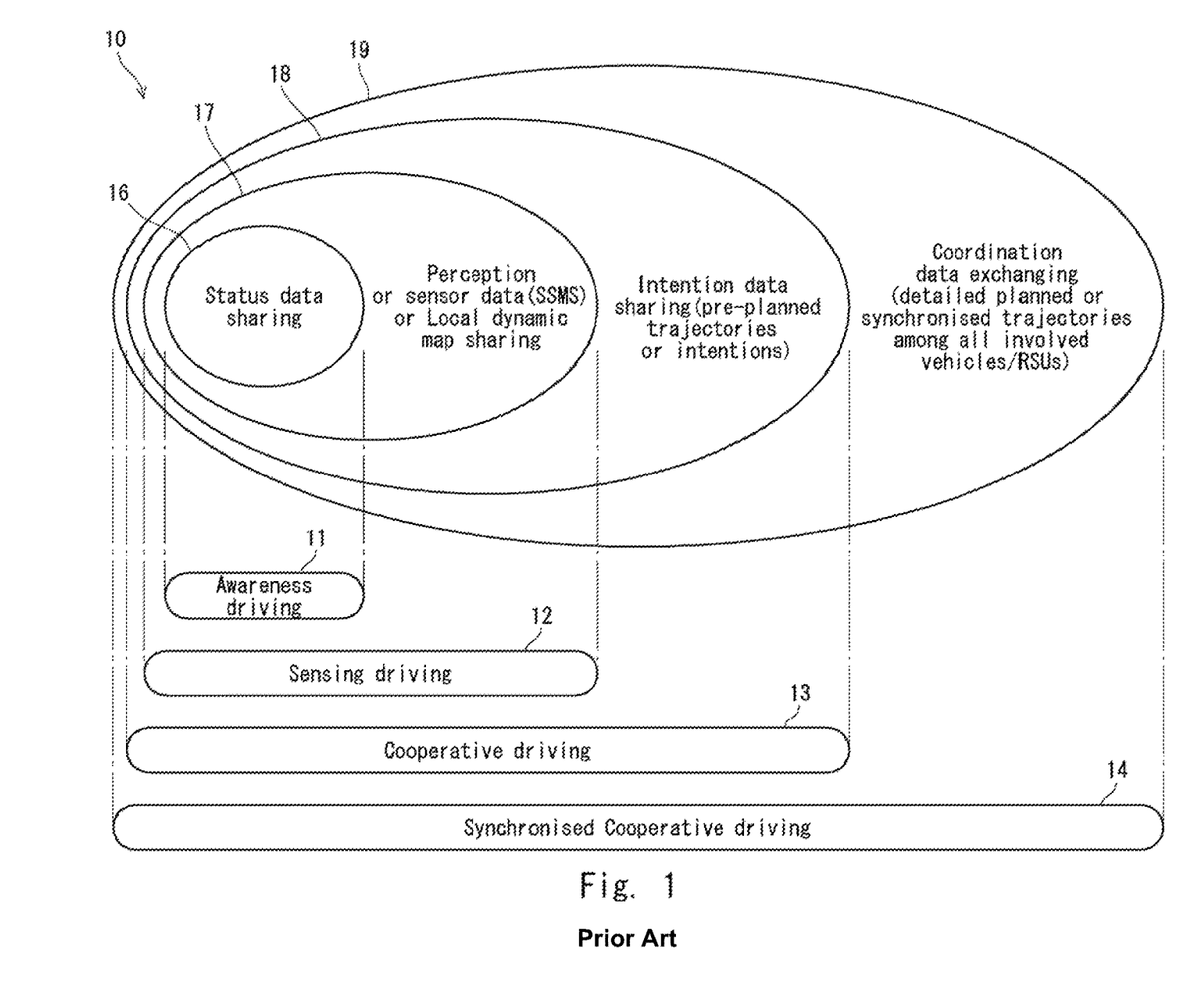
FIG. 1 illustrates an expected roadmap of V2X application evolution.

FIG. 1 illustrates an expected roadmap 10 of V2X application evolution. Initially, V2X applications are expected to include awareness driving 11 based upon the sharing of status data 16. LTE based technology may be sufficient for sharing the status data 16, which may include position, speed and heading. This sharing of status data 16 allows other nearby vehicles, infrastructure nodes and/or pedestrians to become aware of the presence of the vehicle, and of any eventual hazards detected on the road.

Emerging V2X applications include more comprehensive sensing-driving 12, cooperative-driving 13, and synchronised-cooperative-driving 14. Sensing driving 12 requires high bandwidth for sharing detailed perception or raw sensor data 17, to enable vehicles to "see with the eyes of others" and so detect otherwise hidden objects or get a more accurate view on what is happening within their environment.

Cooperative-driving 13 requires URLLC to enable vehicles to reliably share their intention data 18 with other traffic participants within a critically short time frame, and so provide then with a glimpse into the individual future of each vehicle. This information may be used by application-level automated driving algorithms to assist in accurately predicting what other traffic participants will do in the near future and so optimise their own decisions and actions promptly.

Synchronised-cooperative-driving 14 requires URLLC with instant or zero connectivity latency feedback to enable vehicles to exchange coordination data 19, with quick/instant confirmation, to in turn enable the vehicles to synchronise driving trajectories among each other. The exchange of coordination data 19 enables optimal driving patterns among vehicles, which may lead ultimately to automatic self-driving vehicles.

In 3GPP 4G systems, i.e. LTE, LTE-A, LTE-A Pro, V2X/eV2X services may be provided through C-V2X and Prose-V2X or sidelink-V2X.

In C-V2X, a vehicle including a UE supporting V2X applications communicates with surrounding vehicles through its servicing network via cellular UL communication and MBMS for DL multicast communication to the receiving vehicles. Such process induces network connectivity and/or processing latency, but reliability may be guaranteed as long as V2X messages transmitting vehicle(s) and receiving vehicles are under good network coverage.

In Prose-V2X or sidelink-V2X, a vehicle including a UE supporting V2X applications communicates with other surrounding vehicles by direct unicast transmission, groupcasting or broadcasting, with or without network assistance. Such process may eliminate network connectivity and processing latency, and reliability is ensured through a fixed number of retransmissions (i.e. 4) as long as V2X messages transmitting vehicle and receiving vehicles are within transmission range and collision is maintained at an acceptable level.

Neither C-V2X nor Prose-V2X techniques have an explicit end-to-end feedback to confirm if transmitted data has been successfully received. Both LTE based C-V2X and Prose-V2X techniques may have implicit end-to-end feedback where a V2X application may transmit a message in response to a received message.

In the absence of implicit end-to-end feedback and ultra-low communication latency, the LTE based C-V2X and Prose-V2X techniques cannot meet stringent requirements for emerging synchronised coordinated driving V2X applications, where transmission of short messages about status-data will be complemented with transmission of larger messages containing sensor data, vehicle intention data, coordination and confirmation for future manoeuver.

In short, the emerging V2X applications require higher data rates, increased reliability, reduced latency, and/or an increased communication range or speed than is achievable using existing systems. As such, there is clearly a need for improved advanced wireless communication systems and methods, and in particular those that enable advanced vehicular communication.

It will be clearly understood that, if a prior art publication is referred to herein, this reference does not constitute an admission that the publication forms part of the common general knowledge in the art in Australia or in any other country.

SUMMARY OF INVENTION

The present invention is directed to advanced wireless communications systems, and methods for providing vehicular communication in such systems, which may at least partially overcome at least one of the abovementioned disadvantages or provide the consumer with a useful or commercial choice.

With the foregoing in view, the present invention in one form, resides broadly in a method for providing vehicular communication in an advanced wireless communication system, the method comprising:

identifying, at a first V2X-UE, one or more second V2X-UEs in proximity to the first V2X-UE;

transmitting, from the first V2X-UE and to the one or more second V2X-UEs, control channel information identifying a portion of a data pool allocated for V2X intention data;

transmitting, from the first V2X-UE and to the one or more second V2X-UEs and on the identified portion of the data pool, V2X intention data; and receiving, at the first V2X-UE and on a reserved feedback channel, confirmation of receipt of the V2X intention data from a V2X-UE of the one or more second V2X-UEs.

Preferably, the control channel information is transmitted in a control channel pool of a resource pool, and the data pool is a data pool of the resource pool.

Preferably, the resource pool is repeated periodically in time.

Preferably, the resource pool comprises a sub-pool of a logical resource pool.

Preferably, the logical resource pool is repeated periodically in time.

Preferably, the logical resource pool comprises a plurality of resource sub-pools, and the resource sub-pool is frequency multiplexed with other resource sub-pools.

Preferably, the resource sub-pool is identified by: a periodicity of the sub-pool, a resource pool in which the sub-pool starts, a resource block within the resource pool on which the sub-pool starts, and a resource block on which the sub-pool ends.

Preferably, the resource sub-pool has a waveform or waveform numerology different to another resource sub-pool within the logical resource pool.

Preferably, the control channel pool and corresponding data pool of the resource pool are frequency-multiplexed.

Preferably, the control channel pool is configured to use a first waveform numerology designed for a small and fixed payload size.

Preferably, the control channel pool comprises a plurality of time-frequency multiplexed control channels.

Preferably, the plurality of time-frequency multiplexed control channels have configurable size.

Preferably, the plurality of time-frequency multiplexed control channels span over one transmission-time-base unit and across one or more resource blocks in frequency.

Preferably, the data pool is configured to use a second waveform numerology designed for a large and variable payload size.

Preferably, the reserved feedback channel comprises one or more resource blocks that are implicitly defined in the data pool by a repeating structure.

Preferably, the one or more resource blocks comprises a first resource block set and a second resource block set.

Preferably, a V2X-UE of the one or more second V2X-UEs is implicitly configured to use the first reserved resource block set for providing confirmation of receipt of the V2X intention data, when the V2X intention data is received on resource blocks prior to the first resource block of the first reserved resource block set.

Preferably, a V2X-UE of the one or more second V2X-UEs is implicitly configured to use the second reserved resource block set for providing confirmation of receipt of the V2X intention data, when the V2X intention data is received on resource blocks subsequent to the first resource block of the first reserved resource block set and prior to the first resource block of the second reserved resource block set.

Preferably, the reserved feedback channel comprises one or more resource blocks that are explicitly defined.

Preferably, resource blocks for V2X intention data and resource blocks of the corresponding feedback channels are separated by a guard interval comprising an integer number of transmission time units.

Preferably, the guard interval is defined as the sum of a maximum allowed TX-RX timing difference, a maximum allowed data channel latency, and a maximum allowed RX-TX switching at a V2X-UE, rounded up to the next integer number of transmission time units.

Preferably, a plurality of feedback formats may be used for confirmation of receipt of the V2X intention data.

Preferably, the one or more second V2X-UEs use the same feedback format for feedback channel coding.

Preferably, different V2X-UEs using a single sub-pool may independently request the second V2X-UEs to use different feedback formats.

Preferably, the first V2X-UE may select a different feedback format for each transmission.

Preferably, the first V2X-UE may enable or disable feedback for each transmission.

Preferably, the first V2X-UE is configured to use a NR-VCI format for providing V2X control information to a plurality of second V2X-UEs including the one or more second V2X-UEs.

Preferably, the NR-VCI format comprises an enhanced legacy SCI part for the reception and decoding of the V2X intention data at the plurality of second V2X-UEs, and a feedback channel information part for the precoding and transmitting feedback channel at the second V2X-UEs.

Preferably, the enhanced legacy SCI part includes a field identifying the one or more second V2X-UEs using identifiers associated with each of the one or more second V2X-UEs.

Preferably, the feedback channel information part includes a field indicating if feedback is required, and the feedback format to be used, and a field indicating which resource-blocks are reservation for feedback channel mapping.

Preferably, the data pool includes a sub-pool configured to share V2X status-data according to an LTE-based numerology.

Preferably, the data pool includes a sub-pool configured to share V2X perception data according an LTE-based or NR-based eMBB numerology.

Preferably, the data pool includes a sub-pool configured to share V2X intention data according an NR-based URLLC numerology.

In another form, the invention resides broadly in an advanced wireless communication system, the system comprising:
a plurality of V2X-UEs including a first V2X-UE configured to:
identify one or more second V2X-UEs in proximity to the first V2X-UE;
transmit, to the one or more second V2X-UEs, control channel information identifying a portion of a data pool allocated for V2X intention data;
transmit, to the one or more second V2X-UEs and on the identified portion of the data pool, V2X intention data; and
receive, on a reserved feedback channel, confirmation of receipt of the V2X intention data from a V2X-UE of the one or more second V2X-UEs.

Embodiments of the present invention provide methods and a framework for achieving URLLC for V2X/eV2X services, and importantly providing instant (or near instant) feedback mechanism at air interfaces. This allows V2X applications to be progressively designed and deployed in phases, and enables synchronised-cooperative-driving applications which require involved vehicles to exchange information data with prompt confirmation to be able to synchronise trajectories.

Embodiments of the invention enable ultra-reliable ultra-low latency 5G V2X communication, which allows a wide range of V2X applications and services to be developed, deployed and enhanced progressively.

Embodiments of the present invention provide dynamic instant (or near instant) feedback on the physical layer, establishing ultra-low latency, closed loop V2X communication. This in turn enables synchronised-cooperative-driving using 5G V2X technology.

Embodiments of the present invention provide a new radio V2X control information (NR-VCI) format including control information for dynamic instant feedback transmission from intended V2X-UE receivers.

Advanced vehicular communication systems are provided, and methods for use in advanced vehicular communication system are provided, to ensure the quality of service of implemented V2X applications and services, and particularly to realise closed loop V2X communication using the disclosed physical layer instant feedback to achieve low communication latency.

The method may comprise identifying one or more second V2X-UEs in close proximity to a first V2X-UE, transmitting, from the first V2X-UE and to the one or more second V2X-UEs, in a configured control channel pool, a plurality of control channels indicating resource blocks and control information for the reception and decoding of the associated shared data channel(s). Furthermore, the method may including indicating to the one or more second V2X-UEs resource blocks for feedback channel mapping and control information for feedback channel coding and precoding. The method may include transmitting from the first V2X-UE and to the second V2X-UEs, in the corresponding data pool, associated data channels carrying intention-data or synchronised-intention-data. A configured control pool may then be monitored at the second V2X-UEs for control channel(s) for further reception and decoding of associated shared data channels. The one or more second V2X-UEs may transmit to the first V2X-UE, in the same data pool, the feedback channel(s) in response to the successful reception and decoding of shared data channel or 'intention data for synchronisation' from the first V2X-UE.

Systems and methods for use in an advanced vehicular communication system, such as the fifth generation (5G) V2X system or the 3GPP New Radio (NR) V2X system, are disclosed that support the realisation of closed loop V2X communication at ultra-low communication latency using physical layer dynamic instant feedback techniques.

In some embodiments, the present invention relates to an advanced vehicular communication system, where V2X-UE equipped vehicles, V2X-UE equipped road side units (RSUs) and other V2X-UEs, participating in awareness-driving, sensing-driving, cooperative-driving, and/or synchronised-cooperative-driving, are concurrently sharing driving related data, including status-data, perception-data, intention-data and coordination and confirmation of future manoeuvre data or synchronised-intention-data using 5G V2X communication technologies.

In one embodiment, the invention relates to a 5G-V2X shared wireless communication method for use in an advanced vehicular communication system that enables 5G V2X-UEs to share coordination or synchronising-intention data and promptly receive confirmation of future manoeuvre data. This may assist in the realisation of the ultimate real time synchronised-cooperative-driving.

The shared wireless communication method may be configured or preconfigured and appear in the form of periodically-scheduled logical resource pools or sub-pools within the logical resource pools. Each logical resource pool or sub-pool may comprises a frequency multiplexed control channel pool and associated shared data pool, where a control channel pool and its associated shared data pool may be further configured or reconfigured with different waveforms or waveform numerologies.

The control channel signal transmission may have a first waveform numerology that has been designed for small and fixed payload size signal processing and result in ultra-short decoding latency and ultra-low BLER (block error rate) on single decoding instance. The data channel signal transmission may have a second waveform numerology that has been designed for large and variable payload size, desirable signal decoding latency and ultra-low BLER through a predefined fixed number of redundant retransmission.

A waveform numerology may be associated with information indicating a subcarrier spacing in kHz and predefined transmission time unit (e.g. in millisecond, milliseconds, or fractional of milliseconds), and a basic transmission unit for physical channel mapping regardless of configured/preconfigured waveform numerology may be defined as a resource block of 12 subcarriers in frequency by 1 transmission time unit in time.

A control channel pool of a logical resource pool or sub-pool for use in intention-data and synchronised-intention-data sharing, may comprise a plurality indexed time-frequency multiplexed control channels with predefined size, where a control channel may be configured or preconfigured to span across one or more resource-blocks in frequency.

The method may comprise a first V2X-UE and a plurality of second V2X-UEs within close proximity, together forming an instantaneous V2X communication group for cooperative-driving or/and synchronised-cooperative-driving. Upon having intention-data or synchronised-intention-data for sharing to surrounding second V2X-UEs establishing a desirable cooperative-driving and synchronised-cooperative-driving scenario, the first V2X-UE may select two or more control channels in the current or incoming control channel pool for transmitting a control channel and its repetitions. The first V2X-UE may further reserve a plurality of resource-blocks in the corresponding data pool for transmitting the associated shared data channel(s) and its redundancies.

A transmit control channel and the repetition(s) indicate resource-blocks may be provided for extracting the associated resource elements (REs) of the shared channels and control information, for further receiving and decoding the associated shared data channels at the second V2X-UEs. Concurrently, the first V2X-UE may consider prompt confirmations or acknowledgements from the second V2X-UEs as being essential for decision making on its immediately future manoeuvre, and further reserve one or more resource-blocks in the same data pool on which the second V2X-UEs may transmit feedback confirmations or acknowledgements upon the successful reception of corresponding shared data channel.

The resource-blocks being reserved for feedback channels transmission may be implicitly or explicitly defined. When implicitly defined, multiple resource-blocks in frequency may be periodically reserved for feedback channel mapping. When explicitly defined, the first V2X-UEs individually and independently reserve resource-blocks for feedback.

The resource-blocks that are reserved for feedback from the second V2X-UEs, and the resource-blocks that are reserved for transmitting the corresponding shared data channel(s) from the first V2X-UE, are separated by a predefined guard interval comprising an integer number of data pool configured transmission time units, which is sufficient for accommodating a maximum allowed TX-RX timing difference, a maximum allowed intention data/shared data channel reception/decoding latency, and RX-TX switching at a second V2X-UE.

When sharing intention-data that requires further confirmation or acknowledgement from the second V2X-UEs, the first V2X-UE may further include in the transmit control channel control information indicating identities (i.e. IDs) of the second V2X-UEs, a required feedback format, reserved resource-block allocation information for feedback channel RE mapping, and feedback channels precoding information enabling the second V2X-UEs to share the same allocated resource block(s) in transmitting the feedback channels.

Upon detecting a control channel intended for it in a control channel pool, a second V2X-UE performs reception and decoding of the associated shared data channel(s) and transmits a precoded feedback channel on the resource-block(s) that are reserved in advance by the first V2X-UE. This provides closed loop V2X communication for synchronised-cooperative-driving.

In another embodiment, a V2X control information (NR-VCI) format providing instant feedback is provided. The NR-VCI format comprises an enhanced legacy SCI portion for the reception and decoding of associated shared data channel, and a feedback channel information portion for the precoding and transmitting feedback channel. The legacy SCI portion includes a bit field indicating one or more V2X-UE IDs that the data message is intended for, where multiple V2X-UE IDs may be encoded for reducing number of bits used in the bit-fields and only be decoded at intended second V2X-UE.

The feedback channel information portion comprises a bit field relating to feedback request information and a bit field relating to resource reservation for feedback channels. The feedback request information may further comprise a bit field indicating whether feedback is required, and a bit field indicating the required feedback format, which can be a compact format or a detailed format. The detailed format may allow a second V2X-UE to provide driving-intention-data that has been updated to synchronise with the planned intention-data which has been received from the first V2X-UE. The resource reservation may comprise a bit field indicating a resource blocks allocation for feedback channel RE mapping and orthogonal codes set for feedback channel precoding.

In other embodiments, a scalable 5G-V2X wireless communication system that may be configured or preconfigured for simultaneous sharing of 5G V2X application data is provided. The application data may include low-bandwidth demand status-data, high-bandwidth demand perception-data, ultra-reliable/ultra-low latency intention-data and ultra-low latency and ultra-reliable synchronised-intention-data.

The scalable 5G-V2X wireless communication system comprises a plurality of subbands from different portions of spectrum and/or from different frequency bands, which have been dedicatedly reserved for V2X communication, forming a logical band for 5G V2X services. In a logical band for 5G V2X services, a plurality of time-multiplexed resource pools of the same period may be configured/reconfigured or preconfigured. A logical resource pool may be further configured or preconfigured to comprise one or more frequency-multiplexed sub-pools where each configured or preconfigured resource sub-pool in a logical resource pool may be dedicatedly allocated to one or multiple V2X applications having the same or similar traffic pattern. For example, three sub-pools may be individually configured or preconfigured for servicing low-bandwidth demand status-data, high-bandwidth demand perception-data, and ultra-reliable/ultra-low latency intention-data including synchronised-intention-data.

In order to achieve the optimum QoS on a particular V2X service, a V2X application sub-pool may be configured or preconfigured with a specific-design waveform or waveform numerology for signal transmission and reception. Resource sub-pools may be configured/preconfigured for sharing V2X status-data is preferably LTE-based numerology enabling the communication among legacy LTE V2X-UEs and NR V2X-UEs, resource sub-pools being configured/preconfigured for sharing V2X perception-data is preferably LTE-based or NR-based eMBB numerology, and resource sub-pools being configured/preconfigured for sharing V2X intention-data including synchronised-intention-data is preferably NR-based URLLC numerology.

A configuration indicating a sub-pool within a logical resource pool may comprise a resource pool start indicating the logical resource pool in which the first configured sub-pool will start to appear, a periodicity indicating how often the configured sub-pools will appear, an N_RB_start indicating a resource block that the configured sub-pool starts, and an N_RB_end indicating resource block that the configured sub-pool ends. The combination of resource pool start, periodicity, N_RB_start, and N_RB_end configuration parameters enable the collision risk on sub-pool level and also allow traffic of one sub-pool flowing over other concurrently configured sub-pools when they are not in used or configured for use.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings, in which.

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way.

DESCRIPTION OF EMBODIMENTS

An embodiment of the present invention comprises a modern wireless communication system, such as an incoming 5G or NR (new radio) system, which provides advanced V2X/eV2X communication.

V2X/eV2X application/service data streams and associated layer 1 control information from one or more V2X-UEs (i.e. UEs supporting V2X/eV2X applications) may be channel-encoded, modulated and mapped on sidelink (SL) channel resources. The streams may be transmitted from a single source or multiple sources and via a single transmitter or multiple transmitters, and using a specific designed waveform or waveforms. Each transmitter may be a set of vehicle mounted antenna entities being designed for achieving directional signal transmission including front-forward direction, rear-backward direction and side-way directions.

The SL channel resources for use at a V2X-UE or V2X-UEs may be assigned by the servicing network of the V2X-UEs on a connection basis, or may be selected through a contention procedure by the V2X-UE among configured/pre-configured channel resources of the network.

Specific waveforms may be individually and optimally designed and selected for each targeted V2X service, V2X application, V2X traffic and/or V2X transport/physical channel, with differentiable performance targets, to achieve ultra-reliable and ultra-low end to end communication latency and communication with feedback confirmation for realising critical V2X/eV2X applications designed for synchronised cooperative driving.

Figure 2:
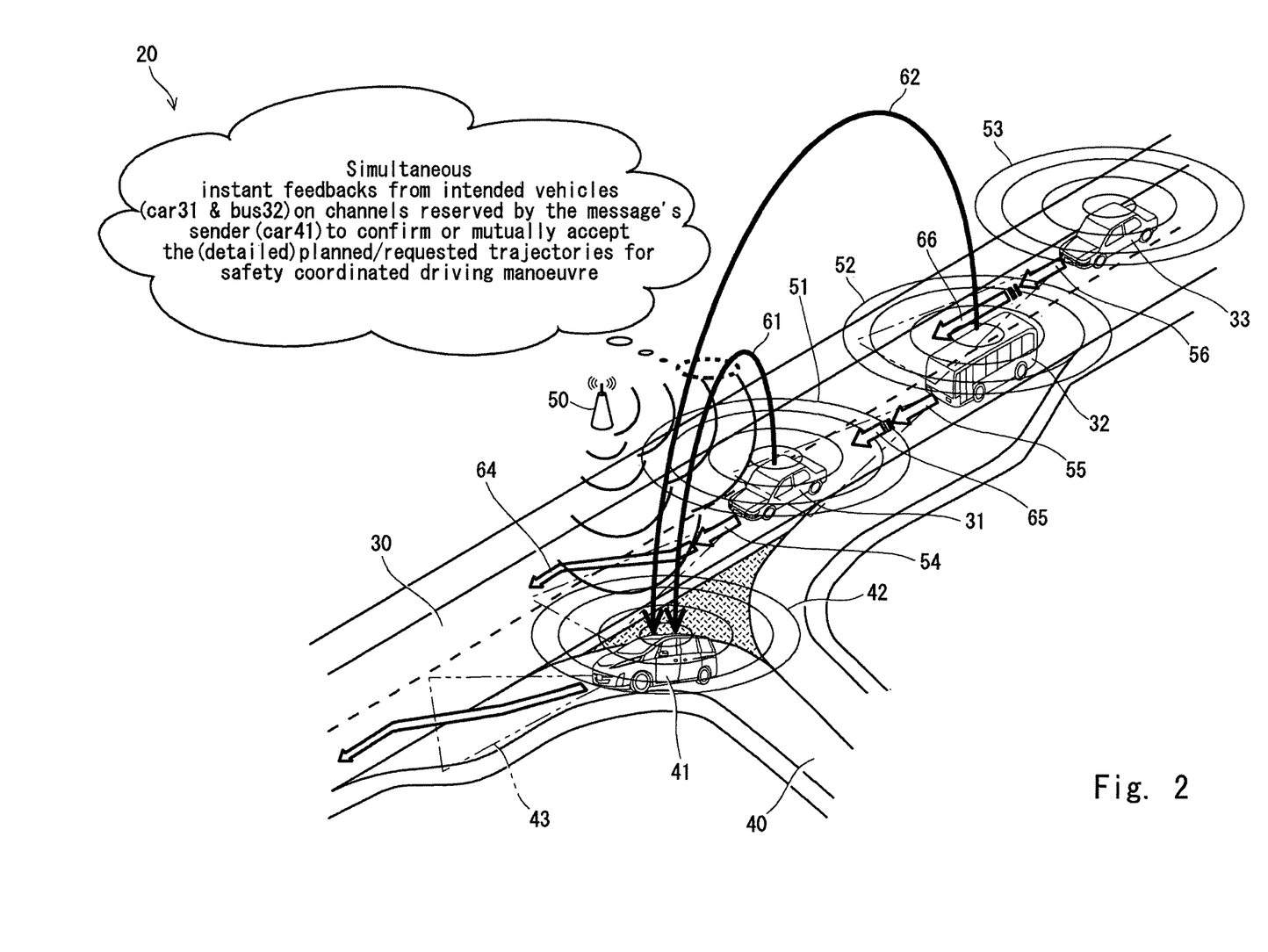
FIG. 2 illustrates a 5G system that provides V2X or eV2X services, according to an embodiment of the present invention.

FIG. 2 illustrates a 5G system 20 that provides V2X or eV2X services, according to an embodiment of the present invention. The system 20 comprises road infrastructure in the form of a primary road 30 a secondary road 40 and RSU 50, first second and third vehicles 31, 32, 33 travelling on the primary road 30, and a fourth vehicle 41 travelling on the secondary road 40 and approaching an intersection which is merging with the primary road 30. All vehicles 31, 32, 33, 41 and RSU 50 are equipped with on-board user equipment supporting V2X/eV2X (i.e. V2X-UEs), which enable the vehicles 31, 32, 33, 41 to share data with each other.

The data may include status-data for awareness-driving, perception data or raw sensor data for sensing-driving, intention-data for cooperative-driving, and intention data with confirmation or synchronised intention data or exchanged coordination data for synchronised-cooperative-driving.

The vehicles 31, 32, 33, 41 may use multiple designed waveforms 42, 51, 52, 53 on different portions or sub-bands of spectrum for sharing their status-data, perception-data, and intention-data, and the sharing of data may be through broadcast, multi-cast or unicast transmission.

To realise synchronised-cooperative-driving, a V2X-vehicle may simultaneously transmit or/and receive status-data, perception-data, and intention-data. In particular, the intention-data may be broadcasted to all surrounding V2X-Vehicles and one or more surrounding V2X-vehicles may be requested to respond with immediate confirmation to enable time critical decisions to take place at the transmitting V2X-Vehicle. This is particular useful in assisting in a safety manoeuvre.

When sharing intention-data which requires immediate confirmation feedback, a V2X-vehicle may dynamically reserve and indicate channel resources within its assigned or contended resources for use by other V2X-vehicles to transmit feedback. The feedback may be immediately and concurrently used by one or more intended V2X-vehicles, without performing contention for the channel resource or requesting the servicing network to assign channel resource, which would cause additional latency.

The dynamically reserved resources for feedback channels are separate from the resources for the associated data channels, with a guard period that is sufficient for a synchronised-intention-data data channel receiver to decode the data channel and then switch from reception to transmission, to transmit confirmation on the feedback channel.

With reference to FIG. 2, the fourth V2X-vehicle 41 on the secondary road 40, which is approaching the intersection that is merging with the primary road 30, may detect the presence of, and receive status data, perception data and intention data 54, 55 of the first and second V2X-vehicles 31, 32.

The fourth V2X-vehicle 41 may include a synchronised-cooperative-driving algorithm, which may in this case decide to share intention data 43 (i.e. information that it intends on enter the primary road onto an inner lane), and further request the first and second V2X-vehicles 31, 32 to confirm their planned trajectory on its advanced reserved feedback channels.

Upon successful reception of the intention data 43 from the fourth V2X-Vehicle 41, the first V2X-Vehicle 31 may send a compact positive confirmation or acknowledgement to the fourth V2X-vehicle 41 on the reserved channel 61 and further share its subsequent driving intention data 64 (i.e. that it intends on changing lane). The second V2X-Vehicle 32 may also send a compact positive confirmation to the fourth V2X-vehicle 41 on the reserved channel 62 and further share its subsequent driving intention data 65 (i.e. that it intends on slowing down).

As a result, trajectories of the fourth, first and second V2X-vehicles 41, 31, 32 are synchronised to provide sufficient and safe space for the fourth V2X-vehicle 41 to safely enter the primary road 30.

Alternatively, the first V2X-vehicle 31 may detect the presence of, and the status data, perception data and intention data 43 of the fourth V2X-vehicle 41 entering the primary road 30, and decide to change its trajectory and share its perception and driving intention to the fourth, second and third surrounding V2X-vehicles 41, 32, 33.

The driving intention includes subsequent driving intention data 64 indicating a lane-change and the first V2X-vehicle 31 further reserves feedback channels in advance for confirmation or acknowledgement from the fourth and third V2X-Vehicles 41, 33 while shared perception data of the first V2X-vehicle 31 may provide the second V2X-vehicle 32 the intention data 42 of the fourth V2X-Vehicle 41. Therefore the second V2X-vehicle 32 may decide to slow down and further share driving intention data 65 indicating same, leaving a safe distance for the fourth V2X-Vehicle 41 to enter the primary road 30 per its planned driving path.

Embodiments of the present invention utilise a 5G or NR V2X resource pool structure and configuration signalling for 5G V2X services that enables V2X applications to be progressively developed and deployed in phases with some degree of backward compatibility. This enables communication between NR-based V2Xs and legacy LTE-based V2Xs to realise advanced driving including awareness-driving, sensing-driving, cooperative-driving, and synchronised-cooperative-driving.

Figure 3A:
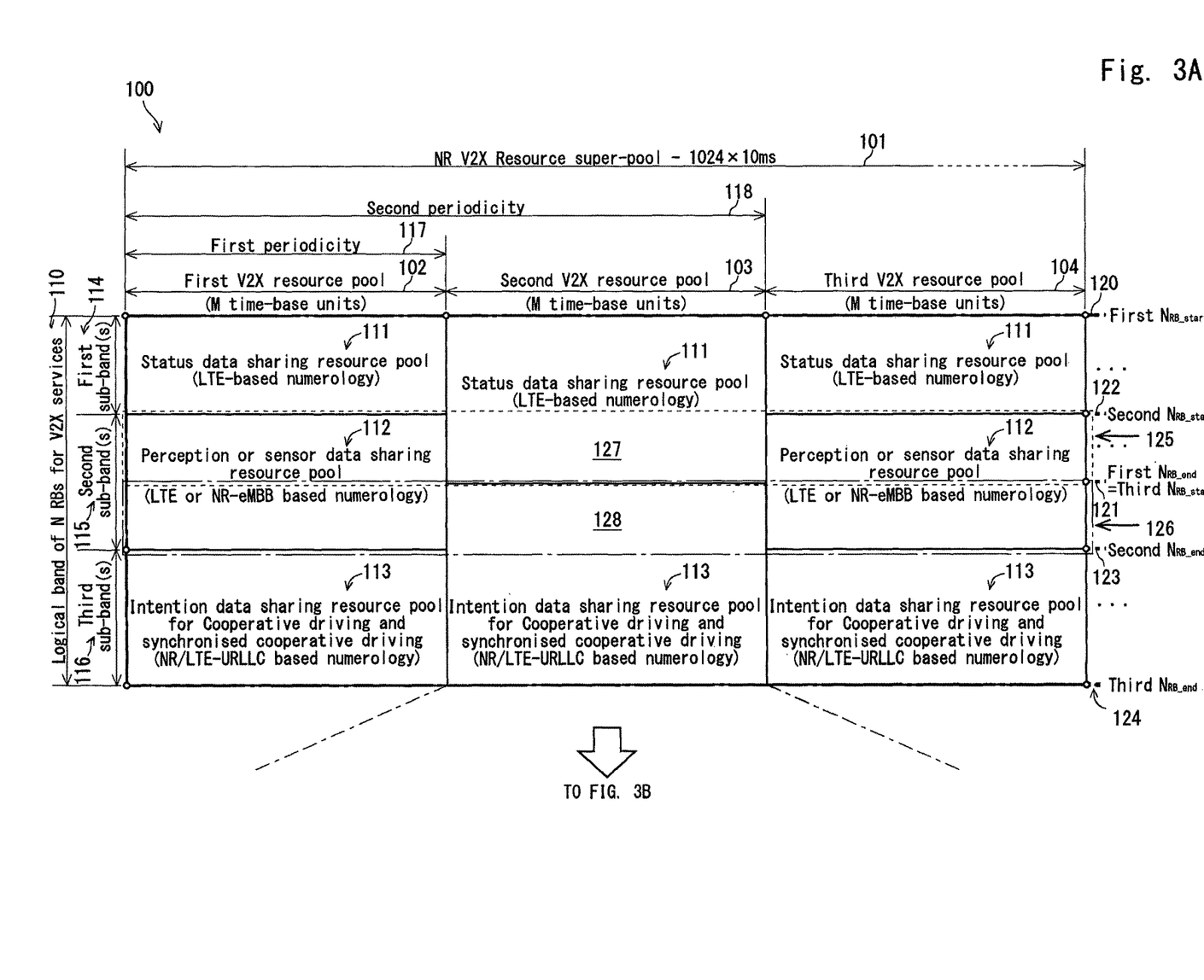
FIG. 3A illustrates a V2X resource pool structure, according to an embodiment of the present invention.

FIG. 3A illustrates a V2X resource pool structure 100, according to an embodiment of the present invention.

The structure 100 includes a plurality of dedicated portions of spectrum in the form of bands or sub-bands, including a first sub-band 114, a second sub-band 115 and a third sub-band 116. Each band or subband may be dedicatedly reserved for a particular V2X application or service. In particular, a status data sharing resource pool 111, a perception or sensor data sharing resource pool 112 and an intention data sharing resource pool 113 may be provided.

The structure includes a logical-resource super pool 101 of 1024x10 ms having overall logical-band 110 of 'N' resource blocks (RBs) comprising plurality individual bands and/or sub-bands for all 5G V2X service(s).

A band or sub-band within the logical band 110, being dedicated for a V2X application/service, may be configured to support one or more specific designed waveforms for signal transmission and reception. For example, the first sub-band 114 may be configured with an LTE-based numerology waveform, the second sub-band 115 may be configured with an LTE-based numerology waveform or an NR-eMBB based numerology waveform, and the third sub-band 116 may be configured with an NR-URLLC based numerology waveform.

In order to create repeatable resources in time within the resource super pool 101, a plurality of V2X logical resource pools 102, 103 104 are provided thereon, where each configured V2X logical resource pool 101, 103, 104 may have a time duration of 'M' predefined transmission time-base units such as slots or subframes. The last V2X resource pool in the V2X resource super-pool 101 may be truncated to have time-duration less than or equal to 'M' transmission time-base units.

The V2X logical resource pool may further comprise single or plurality of overlapping V2X-application resource pools, where a V2X-application resource pool may be configured with a specific waveform for optimal (or near optimal) V2X-application traffic signal transmission/reception. The V2X-application resource pools may be configured using a plurality of configuration parameters including a periodicity, a resource pool start, an N_RB_start, and an N_RB_end to indicate how often a configured V2X-application resource pool occurs at the logical V2X resource pool level, which V2X resource pool in a 5G/NR V2X logical resource super-pool that a configured V2X-application resource pool starts, and the V2X-application resource pool's position in frequency domain within the logical band.

The status-data sharing resource pool 111, the perception-data sharing resource pool 112, and the intention-data sharing resource pool 113 may be configured or preconfigured. In particular, the status-data sharing resource pool 111 may have a first periodicity 117 (of length 1 resource pool), a resource pool start equal to a start of a first V2X resource pool 102 (i.e. 0 offset), a N_RB_start equal to a first $N_{RB\_start}$ 120, the N_RB_end equal to a first $N_{RB\_end}$ 121.

This allows the status-data sharing resource pool 111 to occur in every V2X logical resource pool (i.e. 102, 103, 104 and so on), and utilise overlapping region 125 for status-data signal transmission/reception when it is not in used for perception-data (127 in 103).

The perception or sensor data resource pool 112 may have a second periodicity 118 (of length 2 resource pools), a resource pool start equal to a start of the first V2X resource pool 102 (i.e. 0 offset), a N_RB_start equal to a second $N_{RB\_start}$ 122, and a N_RB_end equal to a second $N_{RB\_end}$ 123.

This allows the perception or sensor data resource pool 112 to occur in every second V2X logical resource pools (102, 104 and so on) starting from the first V2X resource pool 102, and allows unused resources (e.g. 127 and 128) in overlapping regions 125, 126 on V2X resource pools (e.g. 103) where no V2X-application resource pool for perception-data sharing being scheduled, to be utilised by other V2X-application traffic such as status-data sharing 111 and intention-data sharing 113.

The intention-data sharing resource pool 113 may have a first periodicity 117 (of length 1 resource pool), a resource pool start equal to a start of the first V2X resource pool 102 (i.e. 0 offset), a N_RB_start equal to a third $N_{RB\_start}$ 121, and a N_RB_end equal to a third $N_{RB\_end}$ 124.

This allows the intention-data sharing resource pool 113 to occur in every V2X logical resource pool (102, 103, 104 and so on) starting from first V2X resource pool 102, and utilising overlapping region 125 for intention-data signal transmission/reception when it is not in used for perception-data sharing (as illustrated by 128 in 103).

Embodiments of the present invention provide a mechanism for use with a V2X-application resource pool that is configured for intention-data sharing to realise layer 1 or physical layer instant feedback, enabling the time critical cooperative-driving and synchronised-cooperative-driving within a shared resource pool.

Figure 3B:
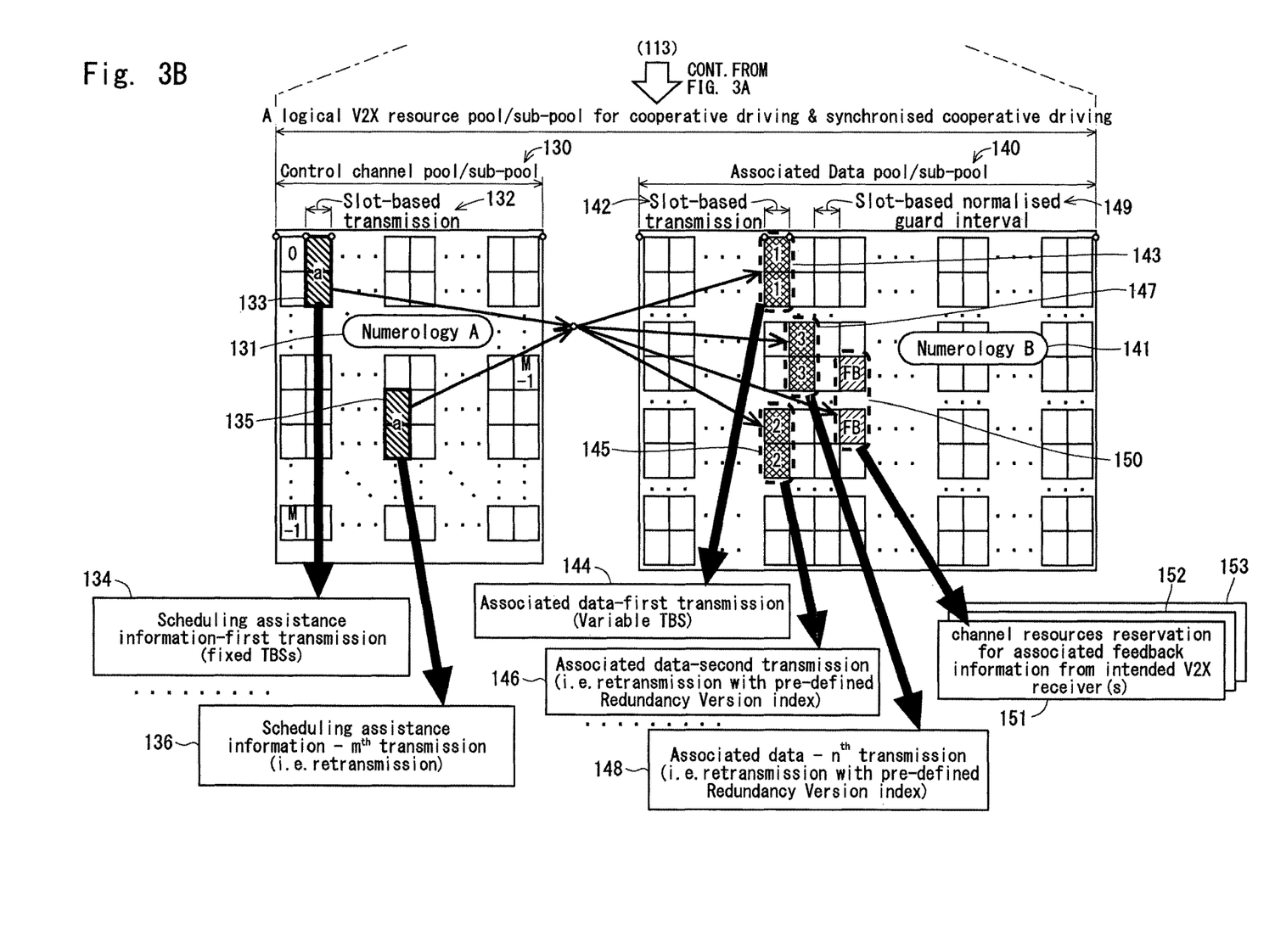
FIG. 3B illustrates a resource pool, according to an embodiment of the present invention.

As illustrated in FIG. 3B, the intention-data sharing resource pool 113 comprises a control pool/sub-pool 130 for layer 1 control channel scheduling assistance information, and an associated data pool/sub-pool 140 for the associated data channel(s) which carries V2X-intention data.

The control pool/sub-pool 130 and its associated data pool/sub-pool 140 are preferably frequency-multiplexed to reduce wireless communication latency. The control pool/sub-pool 130 and its associated data pool/sub-pool 140 may be further configured with different waveform numerologies for control channel signal transmission/reception and for data channels signals transmission/reception, as illustrated by numerology A 131 and numerology B 141, respectively.

Waveform numerology A 131 may be designed for small and fixed payload size signal processing with ultra-short processing/decoding latency and ultra-low block error rate (BLER), while the waveform numerology B 141 may be designed for large and variable payload size with low signal processing latency and ultra-low BLER through redundant retransmission.

The control pool/sub-pool 130 comprises "M" indexed control channels, where a control channel (e.g. 133) can be configured to span over one transmission time base unit such as slot-based transmission 132 and across one or more localised or distributed RBs.

Control channel indexes (e.g. 133) are arranged for being repeated in other time-base units (e.g. 135) within the same control pool such that all indexes in a time-base unit are further repeated in other differentiable time base units allowing at least one transmission or retransmission to be heard at a different time base unit. For example, V2X-vehicles selecting control channel indexes on time base unit 132 for their control channel transmission cannot receive scheduling assistance information in the first transmission 134 on channel index 'a' 133 due half-duplex restriction.

The retransmission of scheduling assistance 136 on the same channel index 'a' at different time base unit 135 enables V2X-vehicles which missed a first transmission to successfully receive the scheduling assistance information.

The scheduling assistance information in the first transmission (e.g. 134) and the one or more retransmissions (e.g. 136) on a control channel with unique index such as 'a' (e.g. 133 and 135) provide identical control information for locating resource block sets (e.g. 143, 145 and 147) on which the associate data channel's first transmission and its redundant retransmission are mapped (144 for the 1$^{st}$ transmission, 146 for 2$^{nd}$ retransmission and 148 for the 3$^{rd}$ retransmission) and for demodulation and decoding of the data channel carrying intention-data or synchronised-intention-data.

A data channel carrying intention-data or synchronised-intention-data associated with a control channel may be mapped over single transmission time base unit such as slot-based transmission 149 and across one or more localised or distributed RBs depending on the data payload size. Furthermore, in the case that transmitting intention-data is a sharing planned trajectory or trajectories for being synchronised (i.e. synchronised intention data) or similar, scheduling assistance information in a first transmission (e.g. 134) and one or more retransmissions (e.g. 136) on a control channel with unique index (e.g. index 'a' 133 and 135) further comprises control information intended to one or more surrounding V2X-vehicles indicating RB (resource-block) or RBs sets (150) which is/are reserved for "instant feedback" transmission from multiple intended V2X-vehicles (e.g. 151, 152 and 153) in response to the received intention-data for synchronisation carried on data channel(s) (e.g. 144 for 1st transmission, 146 for 2nd retransmission and 148 for 3rd retransmission).

Additionally, the RB set (e.g. 150) being reserved for instant feedback transmission (e.g. 151, 152, 153) is offset from the resource block set (e.g. 147) being allocated for the corresponding last data channel retransmission (e.g. 148) by a predefined transmission time-base normalised (e.g. slot-based normalised) guard interval 149 which is designed to include a RX-TX timing difference, maximum allowed signal processing/decoding latency and maximum allowed RX-TX switching.

According to embodiments of the present invention, resources reservation for instant feedback within a V2X-application resource pool being configured for intention-data sharing can be configured (or preconfigured) explicitly or implicitly.

When explicit resource-block reservation for instant feedback is used, V2X-vehicles transmitting intention-data for further synchronisation or synchronized intention data in a V2X-application resource pool being configured for intention data sharing, individually reserve RBs or RBs set of different sizes corresponding to different requested instant feedback formats.

Figure 4:
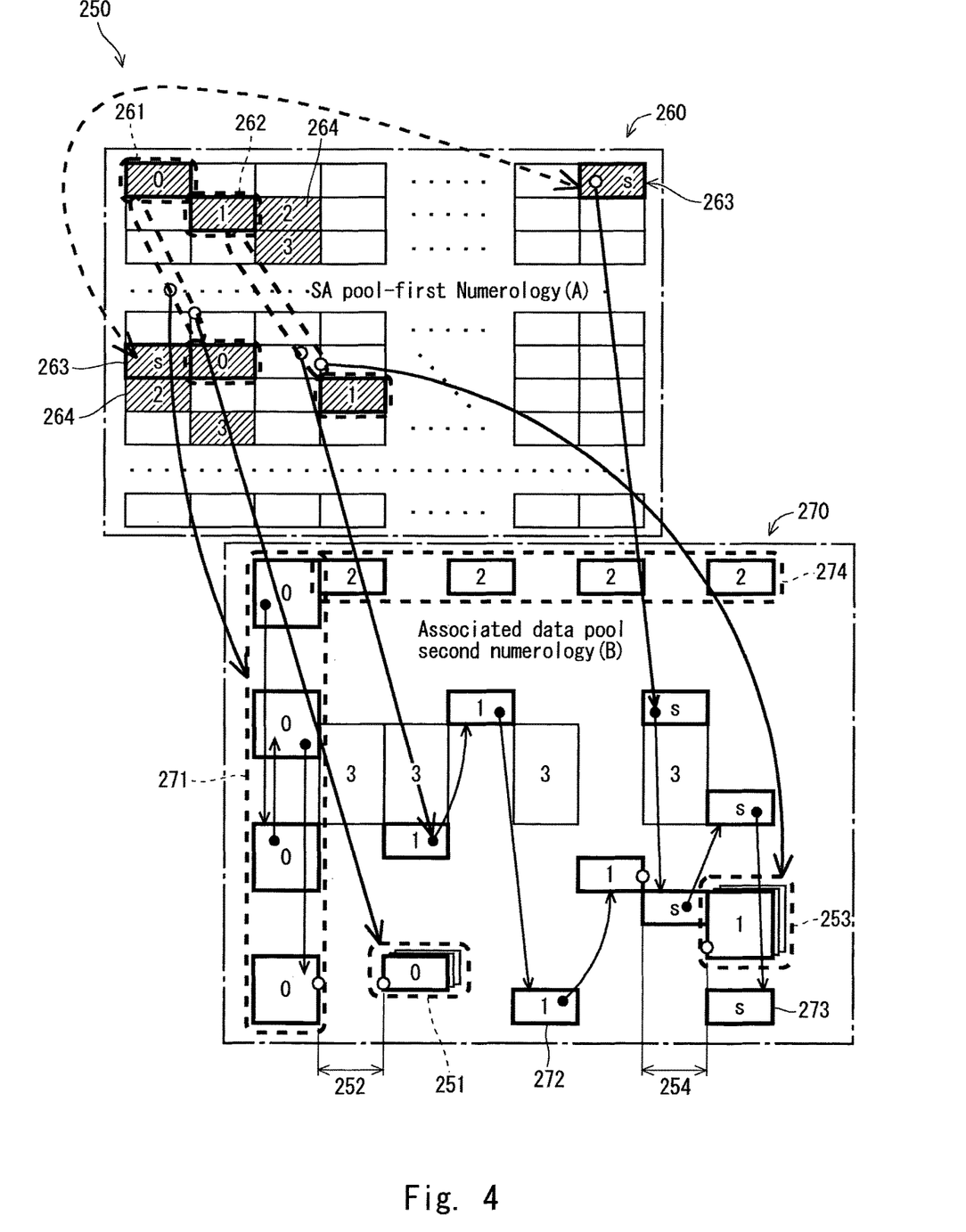
FIG. 4 illustrates an exemplary V2X resource pool structure, with explicit resource reservation for instant feedback, according to an embodiment of the present invention.

FIG. 4 illustrates an exemplary V2X resource pool structure 250, with explicit resource reservation for instant feedback, according to an embodiment of the present invention.

The V2X resource pool structure 250 comprises a control pool in the form of an SA pool 260 and an associated data pool 270.

In sharing synchronized intention data, a V2X-vehicle may select a pair of control channels with index '0' (as illustrated by 261) for transmitting its scheduling assistance information in the control pool 260. The scheduling assistance information provides control information for the reception and decoding of a data channel 271 (and its redundancies), which carrying the synchronized intention data in the associated data pool 270.

The V2X-vehicle may further reserve and indicate to the intended V2X-vehicles within its transmission range through the same control channels 261, a single RB 251 in the same data pool 270 for compact 'instant feedback' transmission. The RB 251 is offset from the resource blocks of the data channel 271 (and its redundant transmission) by a guard interval 252.

Concurrently, in the same V2X-application resource pool 250, another V2X-vehicle may select a pair of control channels with index '1' (as illustrated by 262) for transmitting its scheduling assistance information in the control pool 260. The scheduling assistance information includes information on requested 'instant feedback' in the control pool 260, which provides control information for the reception and decoding of data channel 272 (and its redundancies), which carry the synchronized intention data, and a pair of resource blocks 253 for detailed 'instant feedback' transmission, in the associated data pool (270).

In the same V2X-application resource pool 250, other V2X-vehicles may select other pairs of control channels (e.g. index 's' 263, and index '2' 264) for transmitting its scheduling assistance information in the control pool 260, which provides control information for the reception and decoding of data channel and its redundancies (e.g. 273 and 274) carrying intention-data for sharing only.

When implicit resource reservation is used for instant feedback, V2X-vehicles transmitting synchronised-intention-data in a V2X-application resource pool being configured for intention-data sharing use the same instant feedback format which can be mapped onto a predefined fixed number of RBs.

Furthermore, regions within a data pool may be periodically reserved for instant feedback transmission.

Data channels carrying synchronised-intention-data, being successfully received immediately prior the first reserved region for instant feedbacks transmission (with a predefined 'guard interval' offset), use the first reserved region for instant feedback transmission.

Data channels carrying synchronised-intention-data, being successfully received between two consecutive reserved regions (e.g. a first and second region) for instant feedback transmission (with a predefined 'guard interval' offset) use the immediately incoming reserved region (i.e. the second region) for instant feedback transmission.

Figure 5:
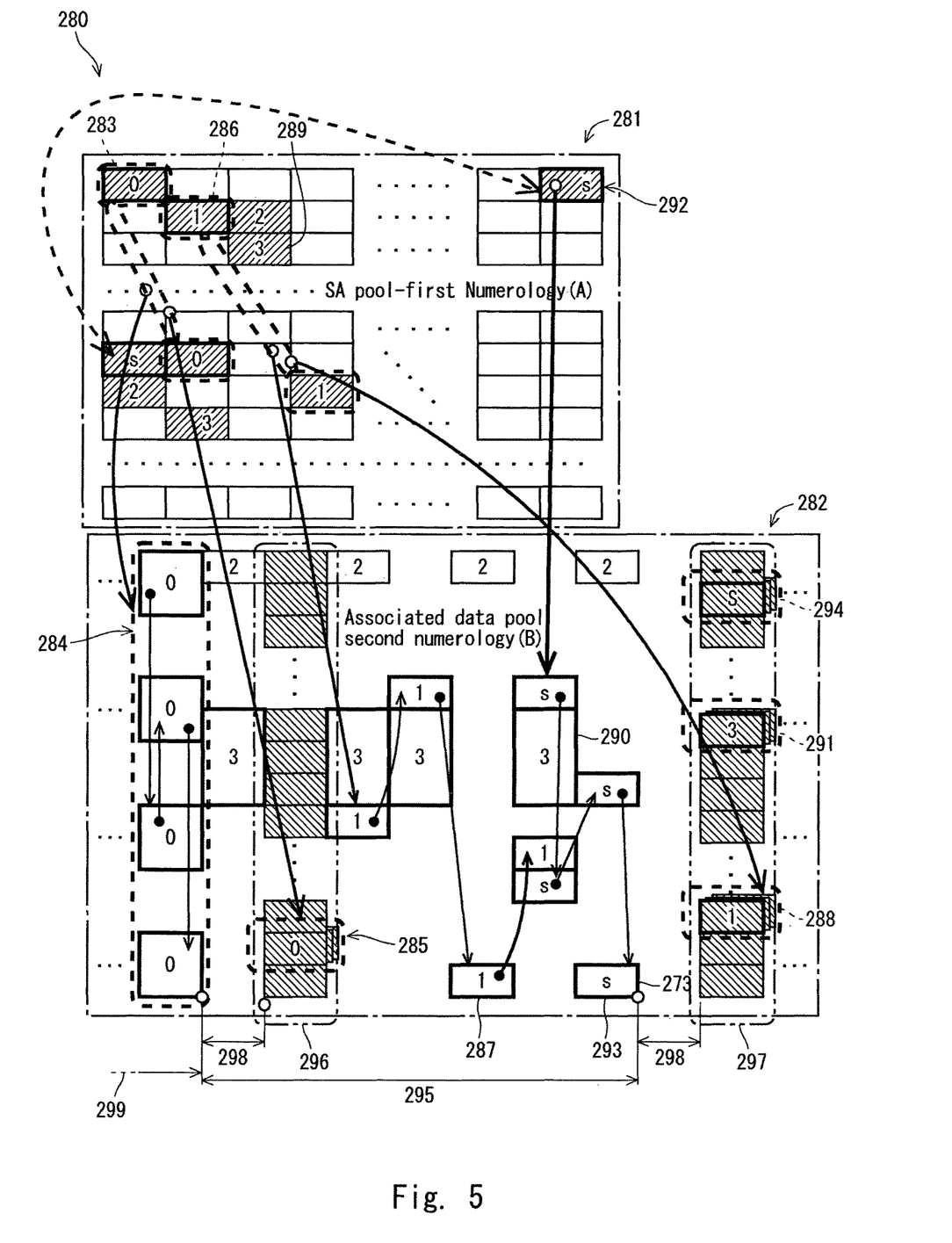
FIG. 5 illustrates an exemplary V2X resource pool structure, with implicit resource reservation for instant feedback, according to an embodiment of the present invention.

FIG. 5 illustrates an exemplary V2X resource pool structure 280, with implicit resource reservation for instant feedback, according to an embodiment of the present invention.

The resource pool structure 280 comprises a control pool in the form of an SA pool 281 and an associated data pool 282. Within the associated data pool 282, periodic regions (e.g. 296 and 297) are reserved for instant feedback transmission.

In the case that a reserved region 296 is the first region for instant feedback transmission, any synchronised-intention-data that is transmitted/received prior to the first region 296 with additional offset 298 (i.e. transmitted in region 299) shall utilise the first region 296 for instant feedback transmission/detection.

For example, in sharing synchronised-intention-data, a V2X-vehicle may select a pair of control channels with index '0' (as illustrated by 283) for transmitting its scheduling assistance information in the control pool 281. The scheduling assistance information provides control information for the reception and decoding of a data channel 284 (and its redundancies), which carry the synchronised-intention-data in the associated data pool 282.

The V2X-vehicle may further reserve a channel index(es) in the incoming region that are reserved for 'instant feedback' (i.e. region 296) and indicate that to the intended V2X-vehicles within its transmission range through the same control channels 283. Alternatively, the V2X-vehicle may not reserve and indicate a channel for 'instant feedback', but instead implicitly allow the intended V2X-vehicle(s) to contend for feedback channel(s) in the incoming region reserved for instant feedback (i.e. region 296).

In the case that reserved regions (296) and (297) are two consecutive first and second regions for 'instant feedback' transmission.

Any synchronised-intention-data that is transmitted/received between consecutive first and second regions 296, 297 and with additional offset 298 (i.e. transmitted/received in region 295), shall utilise the second region 297 for 'instant feedback' transmission/detection.

For example, in sharing synchronised-intention-data, V2X-vehicles may select a pair of control channels with index '1' 286 and 's' 292 for transmitting their scheduling assistance information in the control pool 281. The scheduling assistance information provides control information for the reception and decoding of data channels 287, 293 (and their redundancies), which carry the synchronised-intention-data in the associated data pool 282.

The V2X-vehicles may independently reserve channel indexes in the incoming region reserved for 'instant feedback' (i.e. region 297) and indicate that to their intended V2X-vehicles within its transmission range through the same control channels 286, 292. Alternatively, the V2X-vehicles may not reserve and indicate channels for 'instant feedback' but instead implicitly allow the intended V2X-vehicles to contend for feedback channels in the incoming region reserved for 'instant feedback' (i.e. region 297).

In the same V2X-application resource pool 280, other V2X-vehicles may select other pairs of control channels (e.g. index '2', and index '3') for transmitting their scheduling assistance information in the control pool 281. Again, the scheduling assistance information provides control information for the reception and decoding of data channels 290 (and their redundancies).

In other embodiments of the present invention, a V2X scheduling assistance information structure in the form of a control information structure is provided, that may assist in realising the instant feedback, mentioned above.

Figure 6:
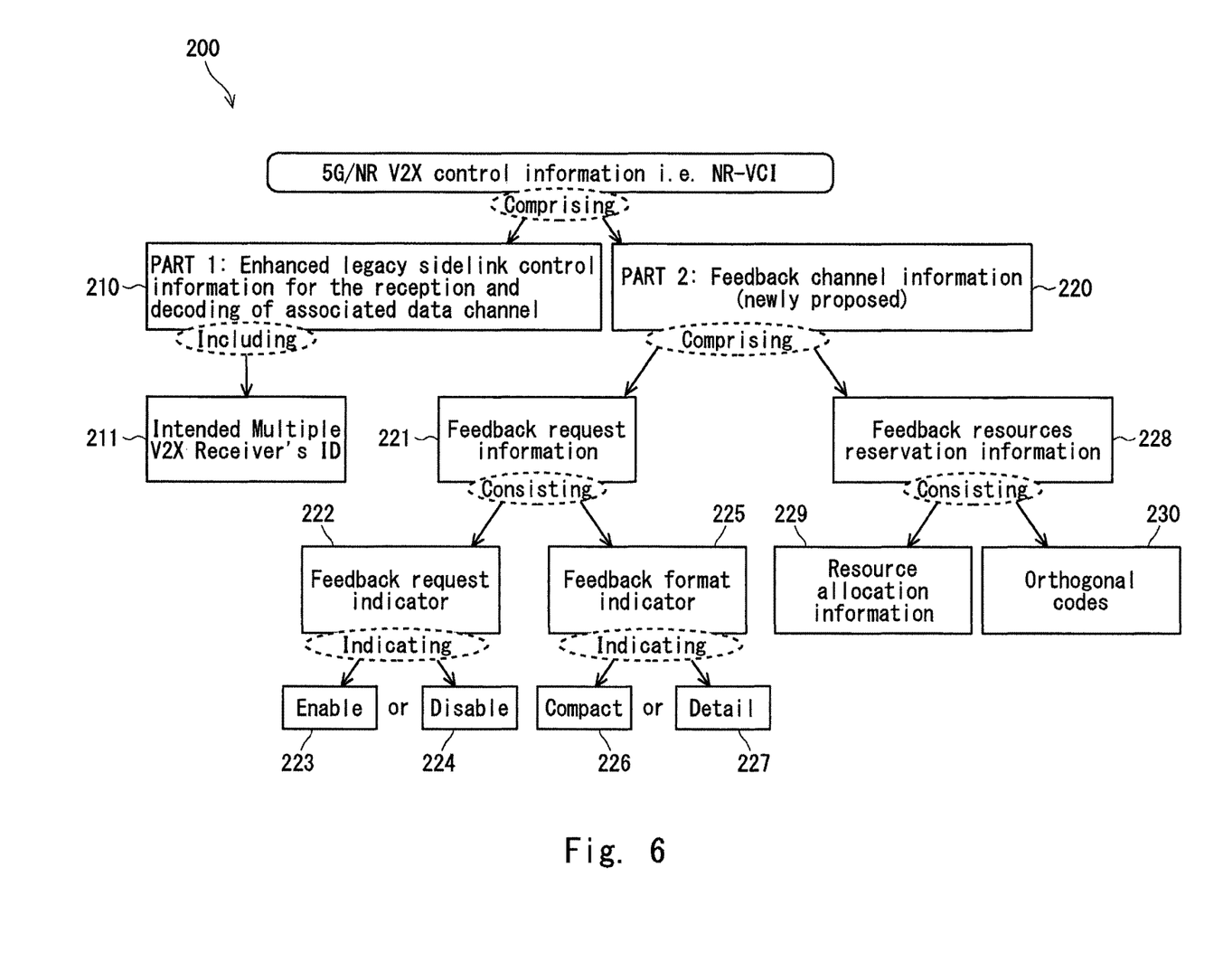
FIG. 6 illustrates a V2X sidelink control information (SCI) structure, according to an embodiment of the present invention.

FIG. 6 illustrates a sidelink control information (SCI) structure 200, according to an embodiment of the present invention. The SCI structure 200 comprises 5G or NR V2X control information (NR-VCI).

The SCI structure 200 comprise two parts, namely a first part (PART1) 210 and a second part (PART2) 220. The first part (PART1) 210 comprises enhanced legacy sidelink control information (SCI) and includes information element (IE) 211 identifying IDs of intended V2X receivers that are requested to provide feedback.

The second part (PART2) 220 comprises control information in the form of feedback request information 221 and feedback resources reservation information 228.

The Feedback request information 221 consists of a 1-bit feedback indicator 222 indicating whether instant feedback is required (i.e. 'enable' 223) or not required (i.e. 'disable' 224), and a 2-bit feedback format indicator 225 indicating which feedback format should be used when providing the instant feedback. The feedback format indicator 225 may identify a format of a plurality of predefined formats.

The feedback format indicator 225 may comprise a 'compact' format indicator 226, which indicates that either ACK or NACK is requested, or a 'detail' format 227, which indicates that additional planned trajectories are requested in return. Other formats may be provided in future evolution of the system. When providing feedback, the UE may implicitly derive the number of RBs required for RE mapping on the feedback channel based upon the feedback format indicator 225.

The feedback resources reservation information 228 consists of resource allocation information 229 and an orthogonal code set 230.

The resources allocation information 229 defines a resource allocation in the data pool for feedback channel RE mapping. If, however, implicit resource-block reservation is used, the resources allocation information 229 need not be provided.

The orthogonal codes set 230 provides codes for feedback channel pre-coding, which allows multiple V2X-UEs to use the same set of RBs for REs mapping and feedback channel transmission. Similarly, if implicit resource-block reservation is used, the orthogonal codes set 230 need not be provided.

While not explicitly illustrated, the skilled addressee will readily appreciate that the V2X-UEs may utilise the above described systems, methods and structures with non-vehicle based V2X-UEs, such as road side units (RSUs) and the like.

Advantageously, embodiments of the invention providing a layer-1 (physical layer) immediate feedback mechanism that enables closed loop ultra-reliable and ultra-low latency direct communication for 5G V2X synchronised cooperative driving.

Embodiments of the invention providing a configurable selection of methods for feedback channel mapping, including an implicit method and an explicit signalling. The implicit signalling may provide for interference management as dedicated resources sub-pool or region are periodically reserved for all feedback transmission, and the explicit signalling may enable the flexibility of applying feedback format base on individual needs/requirements.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

REFERENCE SIGNS LIST 10 roadmap
16 status data
17 sensor data
18 intention data
19 coordination data
30 primary road
31, 32, 33, 41 vehicles
40 secondary road
42, 51, 52, 53 waveforms
50 RSU
100 pool structure
101, 102, 103, 104 resource pool
110 logical band
111, 112, 113 resource pool
114, 115, 116 sub-band
250, 280 resource pool structure
260, 281 control pool
270, 282 data pool

The invention claimed is:

1. A method for providing vehicular communication in an advanced wireless communication system, the method comprising:

identifying, at a first on-board user equipment supporting Vehicle to Everything communication (V2X)/Enhanced V2X (eV2X) applications (V2X-UE), one or more second V2X-UEs in proximity to the first V2X-UE;

transmitting, from the first V2X-UE and to the one or more second V2X-UEs, control channel information identifying a portion of a data pool allocated for V2X intention data;

transmitting, from the first V2X-UE and to the one or more second V2X-UEs and on the identified portion of the data pool, V2X intention data; and receiving, at the first V2X-UE and on a reserved feedback channel, confirmation of receipt of the V2X intention data from a V2X-UE of the one or more second V2X-UEs, the reserved feedback channel being reserved by the first V2X-UE for feedback transmission by the one or more second V2X-UEs.

2. The method of claim 1, wherein the control channel information is transmitted in a control channel pool of a resource pool, and the data pool is a data pool of the resource pool.

3. The method of claim 2, wherein the resource pool is repeated periodically in time.

4. The method of claim 2, wherein the resource pool comprises a sub-pool of a logical resource pool.

5. The method of claim 4, wherein the logical resource pool is repeated periodically in time.

6. The method of claim 4, wherein the logical resource pool comprises a plurality of resource sub-pools, and wherein the resource sub-pool is frequency multiplexed with other resource sub-pools.

7. The method of claim 6, wherein the resource sub-pool is identified by: a periodicity of the sub-pool, a resource pool in which the sub-pool starts, a resource block within the resource pool on which the sub-pool starts, and a resource block on which the sub-pool ends.

8. The method of claim 6, wherein the resource sub-pool has a waveform or waveform numerology different to another resource sub-pool within the logical resource pool.

9. The method of claim 2, wherein the control channel pool and corresponding data pool of the resource pool are frequency-multiplexed.

10. The method of claim 2, where the control channel pool is configured to use a first waveform numerology designed for a small and fixed payload size.

11. The method of claim 2, wherein the control channel pool comprises a plurality of time-frequency multiplexed control channels.

12. The method of claim 11, wherein the plurality of time-frequency multiplexed control channels have configurable size.

13. The method of claim 12, wherein the plurality of time-frequency multiplexed control channels span over one transmission-time-base unit and across one or more resource blocks in frequency.

14. The method of claim 2, wherein the data pool is configured to use a second waveform numerology designed for a large and variable payload size.

15. The method of claim 1, wherein the reserved feedback channel comprises one or more resource blocks that are implicitly defined in the data pool by a configurable repeating structure.

16. The method of claim 15, wherein the one or more resource blocks comprises a first resource block set and a second resource block set.

17. The method of claim 16, wherein a V2X-UE of the one or more second V2X-UEs is implicitly configured to use the first reserved resource block set for providing confirmation of receipt of the V2X intention data, when the V2X intention data was received on resource blocks prior to the first resource block of the first reserved resource block set.

18. The method of claim 16, wherein a V2X-UE of the one or more second V2X-UEs is implicitly configured to use the second reserved resource block set for providing confirmation of receipt of the V2X intention data, when the V2X intention data was received on resource blocks subsequent to the first resource block of the first reserved resource block set and prior to the first resource block of the second reserved resource block set.

19. The method of claim 1, wherein the reserved feedback channel comprises one or more resource blocks that are explicitly defined.

20. An advanced wireless communication system, the system comprising:
- a first on-board user equipment supporting Vehicle to Everything communication (V2X)/Enhanced V2X (eV2X) applications (V2X-UE); and
- one or more second V2X-UEs,
- wherein a plurality of V2X-UEs include the first V2X-UE and the one or more second V2X-UEs, and wherein the first V2X-UE is configured to:
  - identify the one or more second V2X-UEs in proximity to the first V2X-UE;
  - transmit, to the one or more second V2X-UEs, control channel information identifying a portion of a data pool allocated for V2X intention data;
  - transmit, to the one or more second V2X-UEs and on the identified portion of the data pool, V2X intention data; and
  - receive, on a reserved feedback channel, confirmation of receipt of the V2X intention data from a V2X-UE of the one or more second V2X-UEs, the reserved feedback channel being reserved by the first V2X-UE for feedback transmission by the one or more second V2X-UEs.

* * * * *